(12) United States Patent
Brieskorn

(10) Patent No.: US 7,088,709 B1
(45) Date of Patent: Aug. 8, 2006

(54) COMMUNICATION SYSTEM

(75) Inventor: Jürgen Brieskorn, Geltendorf (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/509,049

(22) PCT Filed: Sep. 7, 1998

(86) PCT No.: PCT/DE98/02634

§ 371 (c)(1),
(2), (4) Date: Mar. 21, 2000

(87) PCT Pub. No.: WO99/16176

PCT Pub. Date: Apr. 1, 1999

(30) Foreign Application Priority Data

Sep. 22, 1997 (DE) ................................. 197 41 772

(51) Int. Cl.
*H04L 12/50* (2006.01)
(52) U.S. Cl. ....................................... 370/357; 370/401
(58) Field of Classification Search ................ 370/351, 370/352, 353, 354, 400, 401, 402, 371, 357; 379/90.01, 93.05, 93.06, 93.08, 93.09, 93.14, 379/93.15
See application file for complete search history.

(56) References Cited

U.S. PATENT DOCUMENTS

| 4,748,656 A |   | 5/1988 | Gibbs et al. |   |
|---|---|---|---|---|
| 5,065,425 A | * | 11/1991 | Lecomte et al. | 379/93.05 |
| 5,287,352 A | * | 2/1994 | Jackson et al. | 370/466 |

(Continued)

FOREIGN PATENT DOCUMENTS

DE 40 08 667 C2 1/1992

(Continued)

OTHER PUBLICATIONS

Hofer, Gerald, "The IOM2 Serial Bus Interface for the Interconnection of ISDN ICs", Electronic Engineering, Jun. (1990), vol. 62, No. 762, pp. 69, 70, 72, 74, and 76.*

(Continued)

*Primary Examiner*—Huy D. Vu
*Assistant Examiner*—Daniel Ryman
(74) *Attorney, Agent, or Firm*—Staas & Halsey LLP

(57) ABSTRACT

A communication system has a computer device, a telecommunication terminal apparatus, and a switch that can be connected to a public telephone network. The computer device and the telecommunication terminal apparatus are connected via a first bus system, and the telecommunication terminal apparatus is connected to the switch via an interface. In a first operating mode of the telecommunication terminal apparatus, data is received from the switch and rerouted to a first bus system and to the computer device. The computer has a processor to process data received by the telecommunication terminal apparatus, and forwards this data to the telecommunication terminal apparatus via the first bus system and the data are further transmitted by the telecommunication terminal apparatus. The first bus system has a greater bandwidth than a second bus system that connects individual internal assemblies of the telecommunication terminal apparatus. In the first operating mode, the telecommunication terminal also forwards data produced by the telecommunication terminal apparatus to the computer device and the computer processor processes the received data. This data is sent back via the first bus system to the telecommunication terminal apparatus which reroutes this data to the switch.

16 Claims, 7 Drawing Sheets

U.S. PATENT DOCUMENTS

| | | | |
|---|---|---|---|
| 5,365,577 A * | 11/1994 | Davis et al. | 379/93.17 |
| 5,453,984 A * | 9/1995 | Mueller | 370/403 |
| 5,483,530 A * | 1/1996 | Davis et al. | 370/465 |
| 5,689,553 A * | 11/1997 | Ahuja et al. | 379/202.01 |
| 5,867,496 A * | 2/1999 | Peres et al. | 370/376 |
| 5,892,764 A * | 4/1999 | Riemann et al. | 370/401 |
| 5,974,043 A * | 10/1999 | Solomon | 370/352 |
| 5,995,150 A * | 11/1999 | Hsieh et al. | 375/240.12 |
| 6,081,841 A * | 6/2000 | Malik | 709/227 |
| 6,091,803 A * | 7/2000 | Thompson | 379/37 |
| 6,366,653 B1 * | 4/2002 | Yeh et al. | 379/93.05 |

FOREIGN PATENT DOCUMENTS

| | | |
|---|---|---|
| DE | 196 36 819 A1 | 3/1997 |
| WO | WO 95/22183 | 8/1995 |

OTHER PUBLICATIONS

Hofer, Gerald, "The IOM2 Serial Bus Interface for the Interconnection of ISDN ICs", Electronic Engineering, Jun. (1990) vol. 62, No. 762, pp. 69, 70, 72, 74, and 76.*

Hofer. "The IOM2 Serial Bus Interface for the Interconnection of ISDN ICs", Electronic Engineering, Jun. (1990) vol. 62, No. 762, pp. 69, 70, 72, 74, and 76.*

Kirner, S. "ISAR—Läβt Daten Statt Wasser Flieβen"—Elektronik, vol. 45, No. 10, Oct. (1996) pp. 56-60.

Höfer, Gerald, "The IOM2 serial bus interface for the interconnection of ISDN ICs", Electronic Engineering, Jun. (1990) vol. 62, No. 762, pp. 69, 70, 72, 74, 76.

* cited by examiner

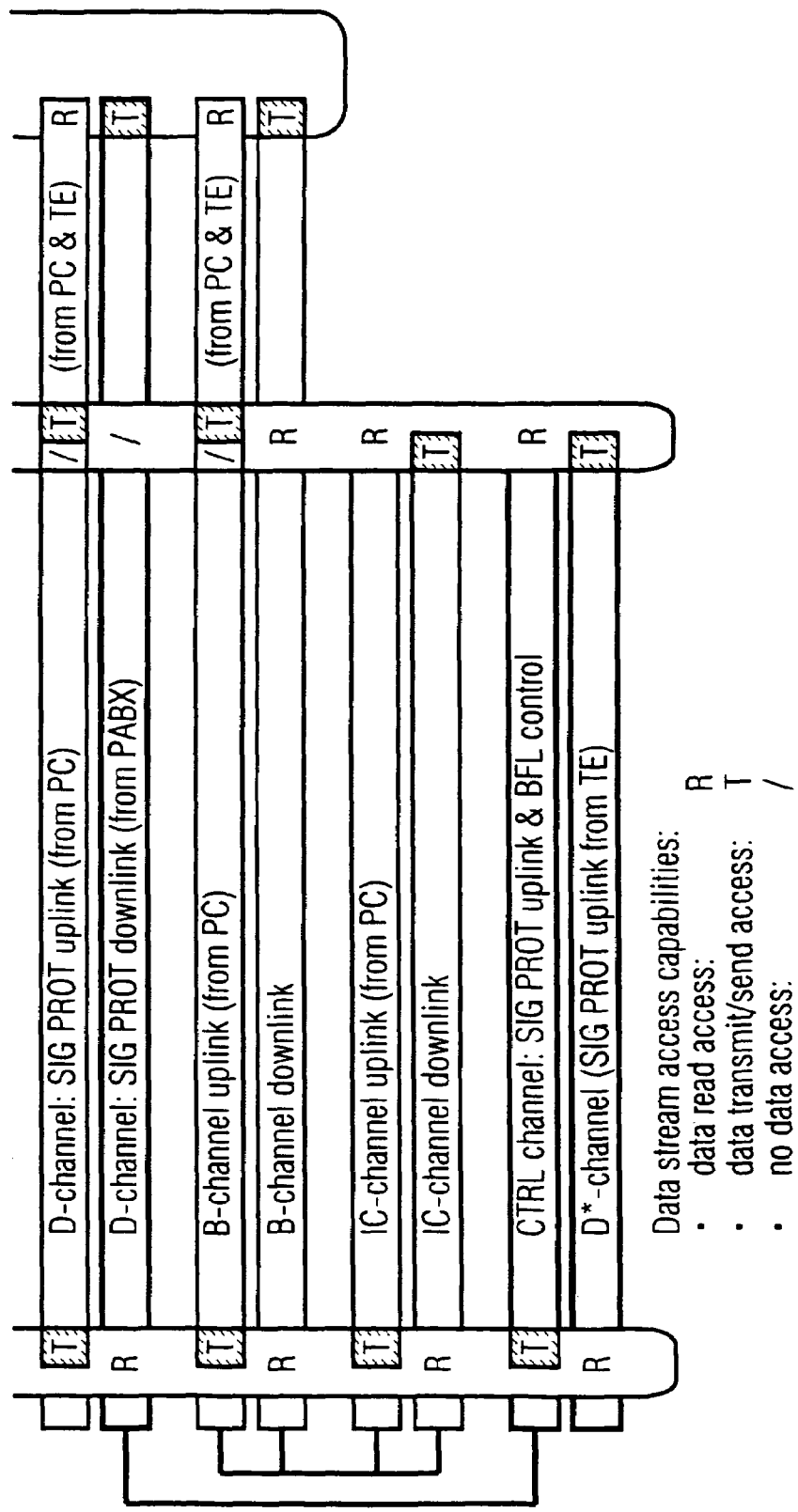

COMMUNICATION SYSTEM

BACKGROUND OF THE INVENTION

1. Field of the Invention

The present invention relates to a communication system for connecting at least one telecommunication terminal apparatus and at least one computer device to a switching device.

2. Description of the Related Art

Analog telephone equipment is increasingly being replaced by digital equipment, based predominantly on the ISDN (Integrated Services Digital Network) standard. ISDN is defined by several international digital communication standards that are recognized worldwide by telephone companies. ISDN technology is used to send both speech and data that can include graphics, sound, films and digital signals via public telephone networks. The ISDN standard comprises digital standard transmission protocols, terminals and connection cables. The user is provided with two types of ISDN terminals. The international base terminal ($S_0$) comprises two B channels, each having 64 Kbit/s, and a D channel having 16 Kbit/s. The B channels transmit the useful information. The D channel is used for the signaling. Up to eight telephones or other terminal apparatuses can then be operated at an $S_0$ interface.

Besides the base terminal ($S_0$), the primary multiplex terminal ($S_{ZM}$), which is likewise internationally standardized, is also provided; it comprises 30 B channels and 1 D channel having 64 Kbit/s.

ISDN telephones can be operated directly at public networks or at private branch exchanges (PABX, Private Automatic Branch Exchange). In Germany, public communication networks standardly provide two-lead $U_{k0}$ interfaces. In what is known as a network termination (NT), these $U_{k0}$ interfaces are converted into a four-lead $S_0$ interface. For normal operation, the network termination requires energy from the public power network. In case of a power failure, the network termination (NT) supplies an emergency-supply-authorized terminal apparatus with energy from the public telephone network. Emergency operation is indicated by a reversal of the supply voltage at the $S_0$ interface.

Terminal apparatuses are preferably connected to private branch exchanges via the $U_{p0}$ interface. The $U_{p0}$ interface likewise transmits two B channels and one D channel. The $U_{p0}$ interface, however, is not internationally standardized. For this reason, in addition to the $U_{p0}$ interface, there also exist many other manufacturer-specific U interfaces.

Since the ISDN standard is a digital standard, it is particularly easy for computers to be connected to ISDN interfaces via plug-in cards. In contrast to speech transmission via telephone or image transmission using fax machines, computers offer the possibility of transmission of very different data formats. Thus, in the domain of the Internet, a multiplicity of image formats, speech compression methods, and formats for transmitting moving images, are used. The use of computers to send and receive faxes as well known as the prior art. With the corresponding software, a computer connected to a printer and to a scanner replaces a fax machine.

One problem in the contemporary PC world is the lack of flexibility of the interfaces used. A PC is standardly equipped with a keyboard interface, one parallel interface and two serial interfaces (RS-232). The keyboard interface is occupied by the keyboard. One serial interface is allocated to the mouse, and the parallel interface is reserved for the printer. Only the second serial interface is available for additional peripheral devices. In the PC domain, data transmission via a serial interface is limited to a maximum of 115.2 Kbit/s. For this reason, peripheral devices that produce large quantities of data, such as scanners, are connected directly to computer-internal busses, PCI bus or the ISA bus, via additional plug-in cards. However, to use such peripheral devices it is necessary to open the computer and install additional plug-in cards. Another disadvantage of the many different interfaces in the PC domain is the use of many different plug connections. In order to solve this problem, various bus systems are known in the prior art. In contrast to the PCI (Peripheral Component Interconnect) and ISA (Industry Standard Architecture) busses, an SCSI (Small Computer Systems Interface) interface can also be led out from the computer housing, and can in this way be used for the connection of up to seven peripheral devices having high data transmission rates, such as hard disks or scanners. A large number of low-price busses are available, such as the Apple Desktop Bus (ADB), the RS-485 interface, which represents an extension of the RS-232 interface, the Access-.bus (A.b), the Connection Highway Interface (CHI), the GeoPort, and, recently, the Universal Serial Bus (USB).

An essential goal in the definition of the USB standard was to provide a low-cost bus system for the connection of external peripheral devices to PCs. The USB bus offers low to medium data transmission rates (up to 12 MBit/s). It is thus very well suited for the connection of a large number of peripheral devices, such as scanners, Personal Digital Assistants (PDAs), keyboards and mice. Up to 127 devices can be connected to the USB bus. In addition, the PCI bus supports plug-and-play functionality. The connecting cables are shielded four-lead lines. Two leads are used for the transmission of a supply voltage of 5 volts. The two other leads are twisted, and are used for signal transmission. For data transmission rates of 1.5 MBit/s, unshielded untwisted cables are sufficient. The plugs are designed in such a way that one terminal apparatus can feed a maximum of 5 amperes into the supply line of the USB bus. The energy supply via the USB bus offers the possibility of producing peripheral devices without power supply units, thus saving costs.

PCs and other terminal apparatuses, such as telephones, can be connected jointly to public telephone networks or also to private branch exchanges. As long as the public telephone network or the private branch exchange provides an interface—such as the $S_0$ interface or the $U_{p0}$ interface—that permits the connection of several terminal apparatuses, the PC and the terminal apparatus can be operated at the same interface, as indicated in FIG. 3. For reasons of cost, telephones are standardly equipped only with the most necessary functions. The telephone or terminal apparatus in FIG. 3 can thus only send data to, and receive data from, the private branch exchange (PABX). Consequently, in FIG. 3 a communication between PC and terminal apparatus is possible only indirectly, via the private branch exchange (PABX). Additional manufacturer-specific solutions according to FIG. 4 have also been created, in which, for example, the PC is connected with the private branch exchange (PABX) via an RS-232 interface, via a terminal apparatus (TE). The advantage of this solution is that at the PC side it is possible to use an already-existing interface, such as the RS-232 interface. It is disadvantageous, however, that this interface does not have the bandwidth required for complete controlling by the PC.

FIG. 3 shows, in addition, the internal construction of a telephone. A telephone essentially has three user interfaces, namely a microphone (acoustic source), a loudspeaker (acoustic sink) and a keyboard for the dialing process (D channel). These three user interfaces, possibly supplemented by additional input and output units, are connected to the private branch exchange (PABX) or to the public telephone network via the telephone-internal IOM-2 bus (Input-Output Multiplexer) with the $U_{pO/E}$ or $S_0$ interface. The IOM-2 interface has a frame structure for three IOM channels. Each of these IOM channels provides four sub-channels, each having 64 Kbit/s. In the IOM-2 frame structure, 2 B channels (64 Kbit/s), one D channel (16 Kbit/s), one D* channel (16 Kbit/s), one CTRL channel (16 Kbit/s) and 2 IC channels (64 Kbit/s) among other things are applied. The B channels are used for data exchange with the switching center, preferably of speech data. The D channel is used for the exchange of control information with the switching center. The two IC channels are used for the exchange of data, preferably speech data, with additional terminal apparatuses, for example slave phones, and the D* channel and CTRL channel are used for the exchange of control information with additional terminal apparatuses. In the connection with an additional telephone (slave phones), the telephone that is connected with the switching center must be configured as a master phone.

U.S. Pat. No. 4,748,656 discloses an interface arrangement that connects a communication system to a telecommunications terminal device. This interface is implemented by a plugin card in a personal computer that, on the one hand, controls the operation of the connected telecommunications terminal device and, on the other hand, offers services of the communication system. The complete signalling from the communication system is interpreted by the personal computer, converted into suitable control signals and forwarded to the telecommunications terminal device. The data received from the telecommunications terminal device are interpreted and modified in the personal computer. Suitable control and signalling messages are derived therefrom from this data that are then forwarded from the personal computer to the communication system. The connection of further peripheral devices to the interface between the personal computer and the telecommunications terminal device, however, is no more possible than is stand-alone operation of the telecommunications terminal device when the personal computer is turned off.

"Isar—läßt Daten statt Wasser fließen", ELEKTRONIK, Vol. 45, No. 20, 1 Oct. 1996, pages 56–60 describes a semiconductor module both for digital as well as for analog data transmission. This module serves the purpose producing cost-beneficial, passive ISDN PC cards that, parallel to the data transfer with ISDN subscribers, can also communicate with subscribers in the analog network and transmit data. The functions of passive ISDN PC cards that are based on the semiconductor module described in this reference are comparable to those of active cards. In one applied example, the semiconductor module is connected to an ISDN transceiver via an IOM-2 bus and is connected to a PC bus interface via a local bus.

SUMMARY OF THE INVENTION

It is the object of the present invention to indicate a solution by way of a PC and a telephone can be connected with a low hardware and software expense, and in which additional peripheral devices can be connected via the interface between the PC and the telephone.

This aim is achieved by way of a communication system having at least one computer device, at least one telecommunication terminal apparatus, and a switch that can be connected to a public telephone network. In this system computer device and the telecommunication terminal apparatus are connected via a first bus system, the telecommunication terminal apparatus is connected to the switch via an interface, the telecommunication terminal apparatus is provided with a first operating mode in which the reception data received from the switch are rerouted by the telecommunication terminal apparatus to the first bus system, and are forwarded via the first bus system to the computer device.

In this system the computer device is provided with a processor for processing the data received from the telecommunication terminal apparatus, and for the forwarding this data to the telecommunication terminal apparatus via the first bus system, whereby the data are emitted by the telecommunication terminal apparatus.

The communication system is characterized in that the first bus system exhibits a greater bandwidth than a second bus system that is employed for the connection of individual, internal assemblies of the telecommunication terminal apparatus, and furthermore that in the first operating mode, the transmission data produced by the telecommunication terminal apparatus are forwarded via the first bus system to the computer device, the computer device processes the received data using the processor, and the processed transmission data are sent back via the first bus system to the telecommunication terminal apparatus, and the telecommunication terminal apparatus reroutes this data to the corresponding interface for forwarding to the switch.

Preferred constructions of the present invention are discussed below.

BRIEF DESCRIPTION OF THE DRAWINGS

In the following, a preferred embodiment of the present invention is explained in more detail with reference to the accompanying drawings.

DESCRIPTION OF THE PREFERRED EMBODIMENTS

Figure 1:
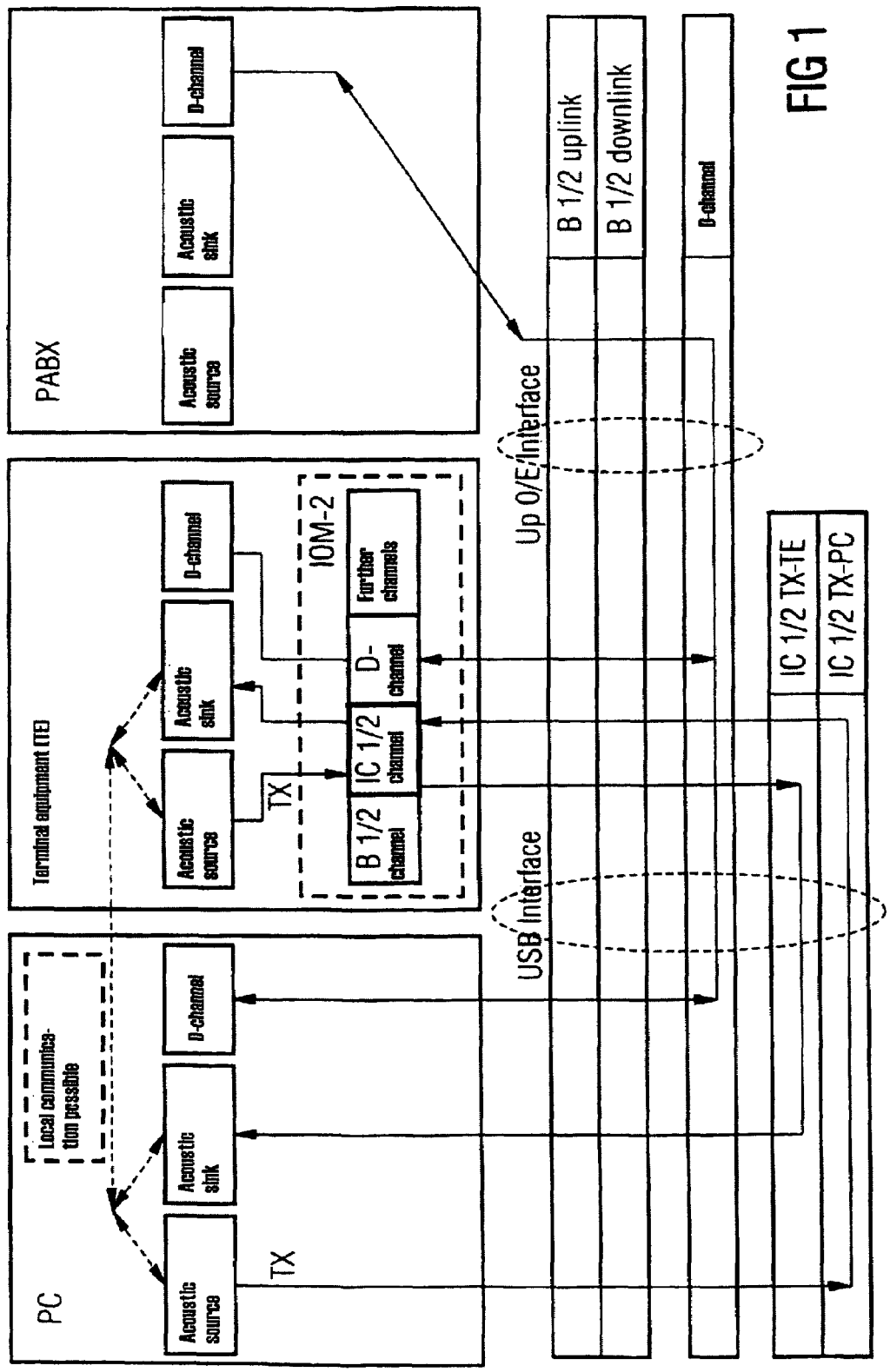
FIG. 1 is a block diagram showing an inventive coupling between the PC and the terminal apparatus via the USB bus, by which the PC is connected with the private branch exchange (PABX) indirectly via USB, and the PC terminal apparatus is connected with the private branch exchange (PABX) via a $U_{pO/E}$ interface, in which the bandwidth of the USB interface is larger—by at least the channels 2 IC, D* and CTRL—than the bandwidth of the $U_{pO}$ interface.
Figure 5:
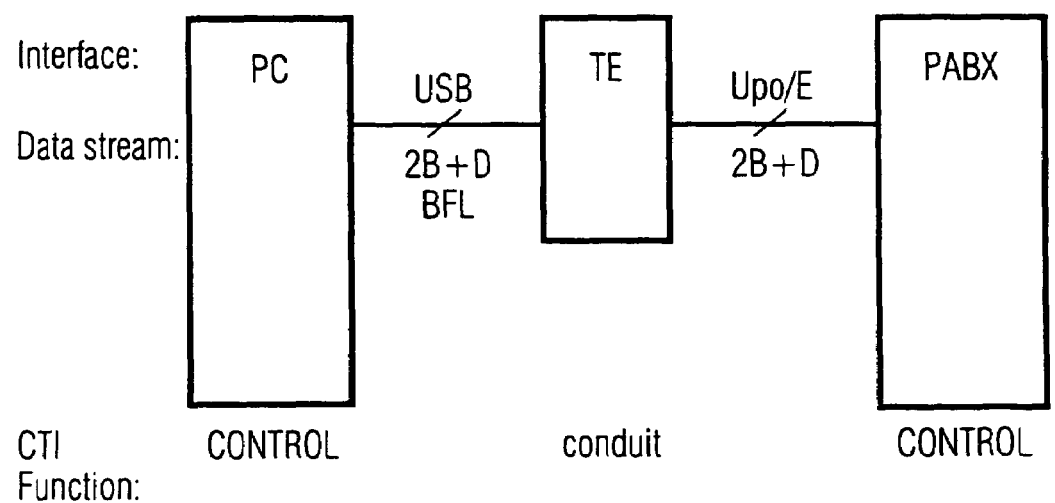
FIG. 5 is a block diagram showing an inventively constructed butterfly architecture, in which PC and terminal apparatus (TE) are connected via a USB bus, and terminal apparatuses are connected with the private branch exchange (PABX) via a $U_{pO/E}$ interface.

According to a preferred embodiment of the present invention, shown in FIG. 1, the terminal apparatus (TE), preferably a telephone, is connected physically with a private branch exchange (PABX) via a $U_{p0/E}$ interface. According to another embodiment, the terminal apparatus can be connected with a public telephone network via another interface, for example an $S_0$ or $U_{k0}$ interface. PC and terminal apparatus are connected physically, preferably via a USB bus. In FIG. 5, the cabling between PC, terminal apparatus (TE) and private branch exchange that is required for the exchange of information according to FIG. 1 is shown.

Figure 2:
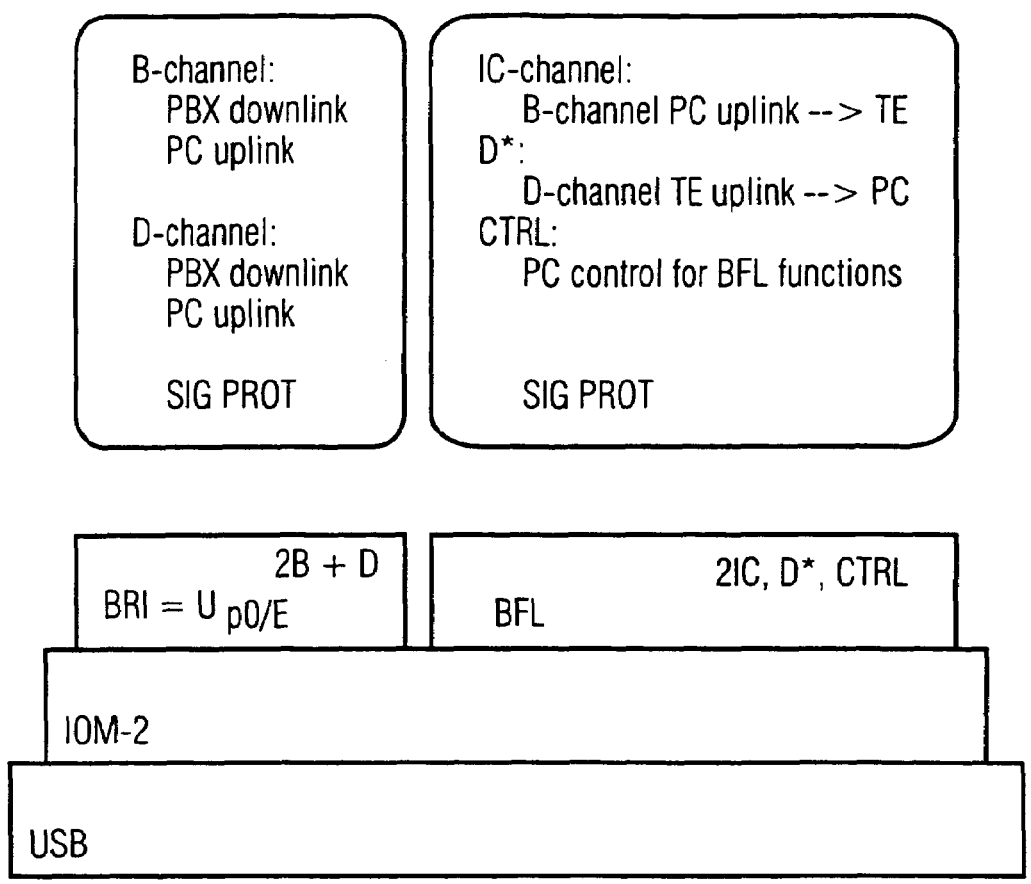
FIG. 2 is a block diagram showing a layer terminal apparatus according to FIG. 1 that can be operated both in the conventional symphony mode (BRI) and also in the inventive butterfly mode (BFL)
Figure 3:
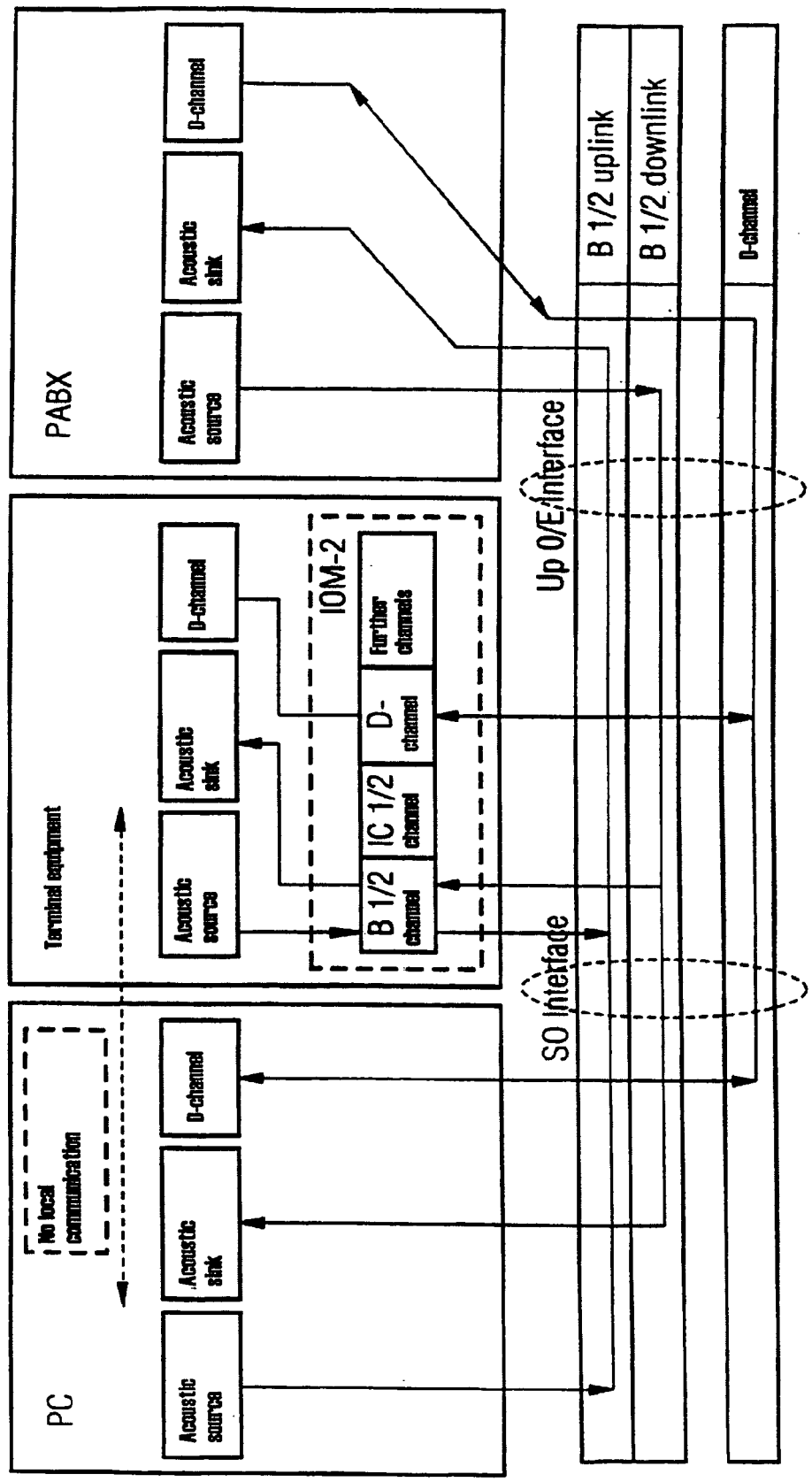
FIG. 3 is a block diagram showing the logical data flow given a conventional connection of a PC and of a terminal apparatus to a private branch exchange (PABX) via an $S_0$ interface or a $U_{pO/E}$ interface, via 2 B channels and one D channel.
Figure 4:
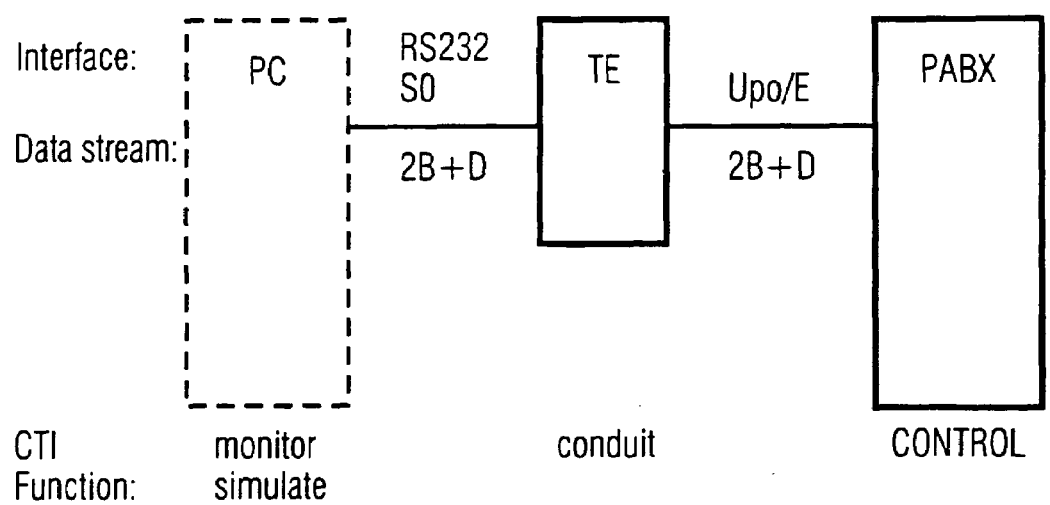
FIG. 4 is a block diagram showing a conventional cabling, given connection of a PC to a private branch exchange via an RS-232 or $S_0$ interface via a terminal apparatus (TE)

In principle, all known busses that can transmit a bandwidth of (4×64 Kbit/s+16 Kbit/s) (4 B channels and 1 D channel) are possibilities for the physical connection between PC and terminal apparatus. However, the hardware expense in the terminal apparatus is particularly low if the physical interface between PC and terminal apparatus can accept the entire bandwidth of the IOM-2 bus, i.e., the entire IOM-2 frame structure (FIG. 2). As was previously mentioned, the bandwidth of the IOM-2 bus is 12×64 Kbit/s. It thus corresponds to 12 B channels, or a total of 768 Kbit/s. This condition is particularly not met by the serial interfaces (RS-232) and the $S_0$ interface (FIG. 4). However, the required bandwidth is, for example, provided by the USB bus.

Since the USB bus is able to transmit the entire IOM-2 frame structure, the two IC channels, the two B channels to the private branch exchange and the D channel need not first be expensively filtered out from the IOM-2 frame structure. Due to the fact that the entire IOM-2 frame structure is transmitted to the PC, the PC can control the terminal apparatus completely. This mechanism additionally allows the data that the private branch exchange sends to the terminal apparatus (downlink) to the easily forwarded to the PC. In addition, by inserting data into the IOM-2 frame structure, the PC can easily send data indirectly to the private branch exchange. For direct communication between the PC and the terminal apparatus, two IC channels are supplied in each direction (uplink and downlink).

Figure 6:
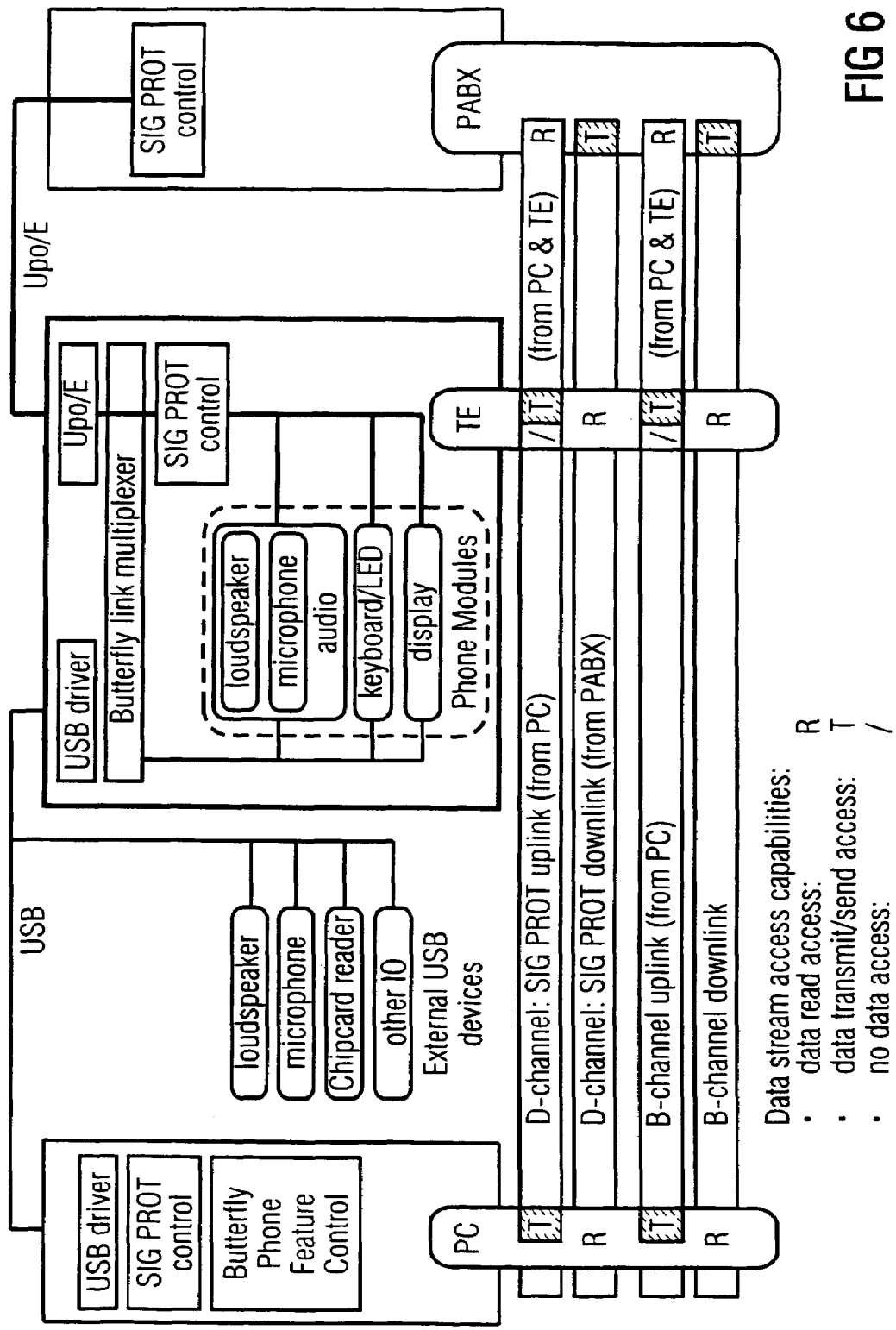
FIG. 6 is a block diagram showing a schematic representation of a data transmission in an inventive butterfly architecture in symphony mode, in which the terminal apparatus is controlled by the private branch exchange in a conventional manner and no data are transmitted directly between PC and terminal apparatus (TE), and FIGS. 7A & B are block diagrams showing a schematic representation of a butterfly architecture in the inventive butterfly mode, in which the terminal apparatus (TE) is controlled by the PC, in which the terminal apparatus only forwards the data between the private branch exchange and PC, and in which, if necessary, the PC again forwards data via the USB bus to the terminal apparatus, for example, for loudspeaker output.

The IOM-2 frame structure does not occupy the complete bandwidth of the USB bus. For this reason, as shown in FIG. 6, additional peripheral equipment can be connected to the PC via the USB bus. Possible devices for this purpose include, for example, microphones, chip card readers, speed dialing memories, keyboards, mice, and cameras for videotelephony.

FIG. 2 shows the interleaving of the respective layer 1 bitframe structure in the terminal apparatus. The lowest layer is represented by the USB bus. The IOM-2 layer is located above the USB layer. The IOM-2 layer corresponds to layer 1 of the OSI layer model in the direction of the terminal apparatus. In the direction of the PC, layer 1 of the OSI model is represented by the USB bus. Layer 1—conversion IOM/USB—takes place in a layer 1 converter (e.g. plug-in adapter in telephone) not shown here. Also not shown in FIG. 2 is the LAP layer, which corresponds to layer 2 of the OSI layer model. Layer 3 of the OSI layer model is designated as a signaling protocol SIG PROT. The signaling protocol SIG PROT can be in two operating states. One operating state is the symphony mode. In symphony mode (see FIG. 4 as well as FIG. 6), the terminal apparatus is controlled by the private branch exchange PABX. The second operating state is the butterfly mode (BFL) (see FIG. 5 as well as FIG. 7). In the butterfly mode, the terminal apparatus only forwards data between the PC and the private branch exchange, without reacting to them. Data (speech) between the PC and the terminal apparatus are exchanged via the two IC channels. The terminal apparatus receives commands from the PC via the control channel (CTRL) (see also FIG. 7). The telephone can send control commands, such as keyboard inputs, to the PC via the D+ channel.

FIG. 6 shows the logical flow of information in the symphony mode. The terminal apparatus communicates with the private branch exchange via the $U_{p0/E}$ interface. The connection (drawn in hold) to the private branch exchange indicates that the private branch exchange controls the terminal apparatus. The PC can communicate with peripheral equipment via the USB bus and can communicate with the private branch exchange via the USB bus and the terminal apparatus. The symphony mode enables telephoning even when the PC is switched off. In symphony mode, the terminal apparatus is controlled by the private branch exchange.

Figure 7:
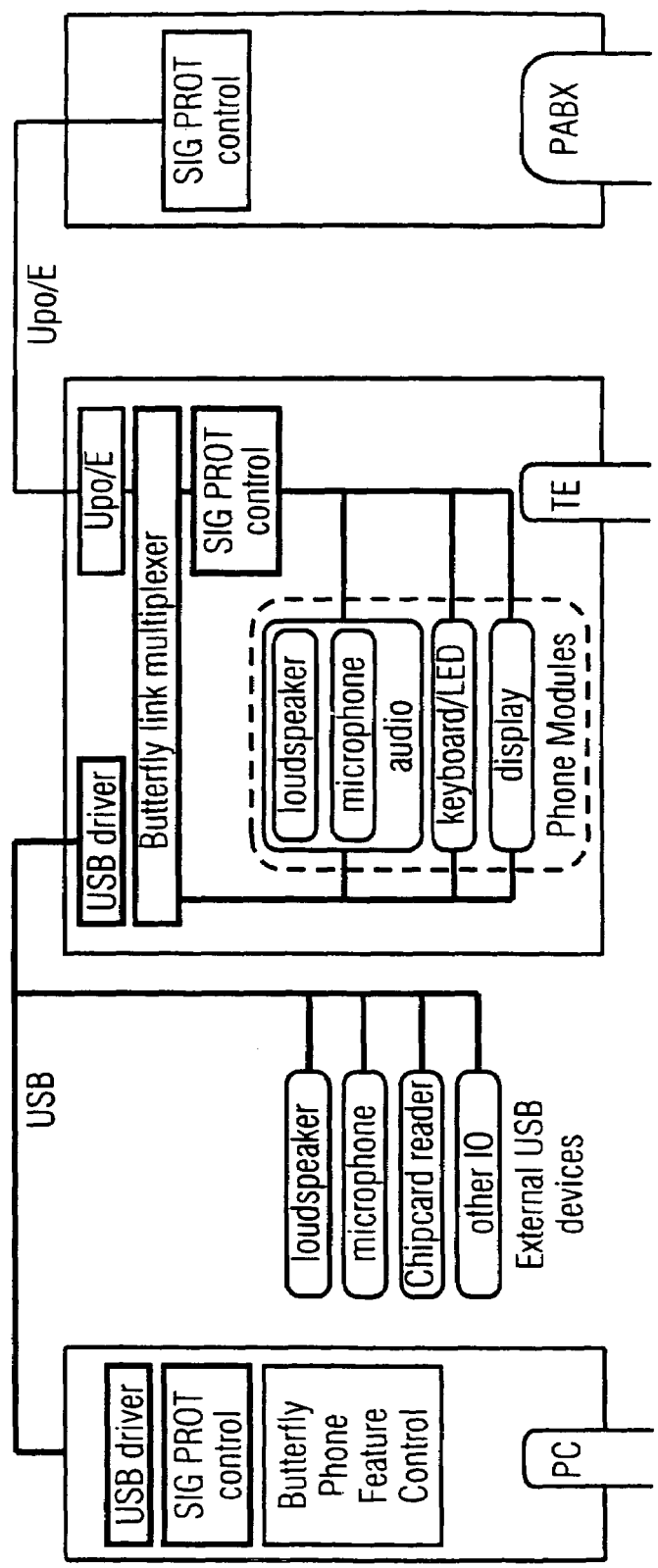

FIG. 7 shows communication in the butterfly mode. The terminal apparatus (TE) is controlled from the PC via the USB bus. This is represented by the USB lines drawn in bold. Data are exchanged only between the PC and the private branch exchange (PABX). These data are merely conducted through the terminal apparatus, and are converted between the $U_{p0/E}$ interface and the USB bus. The PC controls the terminal apparatus via the control channel (CTRL). Keypad inputs on the telephone are transmitted to the PC via the D* channel. The terminal apparatus and the PC can exchange data (speech) via the IC channels.

The butterfly architecture enables the pre-processing of data from the private branch exchange in the PC, and subsequent output on the telephone. Conversely, for example, speech inputs via the telephone can be pre-processed in the PC before forwarding to the private branch exchange. For example, the PC can carry out speech encryption. Here the PC would forward the speech data coming from the telephone to the private branch exchange in encrypted form. Encrypted speech signals from the private branch exchange are forwarded to the terminal apparatus in plain text. Since only one B channel to the private branch exchange and one IC channel to the terminal apparatus are respectively occupied, parallel operation of an additional B channel application in the PC is possible.

In addition, the butterfly architecture is suitable for the implementation of a telephone answering device on the PC. The PC is characterized by high computing power and large memory capacity on the hard drive. For the implementation of a call answering device function in the butterfly architecture, it is thus sufficient to expand the software on the PC. The speech input and output preferably takes place again via the telephone. Alternatively, additional peripheral devices can, for example, be connected to the PC.

Another preferred field of application of computer-telephone integration using the butterfly architecture is videotelephony. The standard H.320 provides a standard for narrow-band image transmission. Since a display screen is already available in the PC, only a camera for recording the image is required. This camera can, for example, be connected to the USB bus. According to the H.320 standard, one B channel of the $U_{pO/E}$ interface is used for the video transmission. The second B channel is available for speech transmission (multiplexed with image data). Speech data are inputted and outputted via the telephone. According to the butterfly architecture, speech data are first exchanged between PC and telephone via an IC channel. The PC sends the speech data to the private branch exchange via a B channel. The speech data are thereby conducted through the telephone. This method makes it possible to keep the hardware expenditures as low as possible, particularly in the telephone, and to standardize the telephone software to the greatest possible extent.

What is claimed is:

1. A communication system, comprising:
   a computer device;
   a telecommunication terminal apparatus having individual internal assemblies;
   a switch, said switch, said computer device, and said telecommunication terminal apparatus all allowing connection to a public telephone network,
   a first bus system that connects said computer device to said telecommunication terminal apparatus;
   a second bus system having a smaller bandwidth than said first bus system that connects the individual internal assemblies of said telecommunication terminal apparatus,
   an interface that connects said telecommunication terminal apparatus to said switch;
   said telecommunication terminal apparatus having a first operating mode in which reception data received from said switch are rerouted by said telecommunication terminal apparatus to said first bus system, and are forwarded via said first bus system to said computer device;
   said computer device comprising a processor for processing the reception data received by said telecommunication terminal apparatus, and for forwarding the reception data to said telecommunication terminal apparatus via said first bus system for output by said telecommunication terminal apparatus;
   said first bus system forwarding transmission data produced by said telecommunication terminal apparatus to said computer device in the first operating mode for processing in said computer device by said processor to change the transmission data into processed transmission data and sending the processed transmission data to said telecommunication terminal apparatus; and
   said telecommunication terminal apparatus rerouting the processed transmission data produced by said telecommunication terminal apparatus to said interface, for forwarding to said switch.

2. A communication system according to claim 1, wherein said processor encodes the transmission data produced by said telecommunication terminal apparatus, and decodes the reception data received from said switch.

3. A communication system according to claim 1, wherein said first bus system is implemented utilizing a USB bus; said second bus system is implemented utilizing an IOM-2 multiplexer; and all data of said IOM-2 multiplexer are transmitted via said first bus system.

4. A communication system according to claim 3, wherein said IOM-2 multiplexer comprises:

a CTRL channel via which said computer device controls said telecommunication terminal apparatus in said first operating mode via a CTRL channel of the IOM-2 multiplexer,];
a D* channel, via which said computer device receives items of control information from said the telecommunication terminal apparatus; and
IC channels, via which said computer device and said telecommunication terminal apparatus exchange data.

5. A communication system according to claim 3,
wherein said IOM-2 multiplexer comprises B channels, and
wherein said telecommunication terminal apparatus reroutes the reception and transmission data only between said interface and the B channels.

6. A communication system according to claim 1, wherein said switch is a private branch exchange.

7. A communication system according to claim 6, wherein said interface is a $U_{pO/E}$ interface.

8. A communication system according to claim 6, wherein said telecommunication terminal apparatus has a second operating mode, in which it is controlled in a conventional manner by said private branch exchange, and which allows operation independent of said computer device.

9. A communication system according to claim 1, wherein said telecommunication terminal apparatus is a telephone.

10. A communication system according to claim 3, wherein:
   said computer device has a program that enables simulation of a telephone answering device;
   said transmission data represent spoken text;
   said computer device further comprises a transmission data store which enables repeated time-displaced forwarding of said spoken text to said switch via said telecommunication terminal apparatus; and
   said reception data which represent messages from callers that are sent by said switch to said computer device via said telecommunication terminal apparatus, that are intermediately stored in said computer device, and that are forwarded in a time-displaced fashion via said telecommunication terminal apparatus, as reception data.

11. A communication system according to claim 1, wherein:
   said computer device further comprises a video conferencing mechanism;
   said computer device obtains the reception data from said switch via said telecommunication terminal apparatus, divides the reception data into image data and speech data, displays said image data on a display screen of said computer device, sends the speech data back to said telecommunication terminal apparatus, and
   said computer device assembles transmission data from the speech data and said image data,
   the speech data originating from a microphone of said telecommunication terminal apparatus being transmitted to said computer device via said first bus system, and the processed transmission data being sent to said switch via said telecommunication terminal apparatus.

12. A communication system according to claim 1, wherein said switch corresponds to the ISDN standard.

13. A communication system according to claim 3, wherein said items of control information comprise items of information produced during a pressing of particular keys of said telecommunication terminal apparatus.

14. A method for transmitting data in a communication system having the elements of a telecommunication terminal apparatus, a computer device, and a switch, wherein said elements are connectable to a public telephone network, comprising:

> connecting said computer device to said telecommunication terminal apparatus via a first bus system;
>
> connecting individual internal assemblies of said telecommunication terminal apparatus with a second bus system having a smaller bandwidth than said first bus system;
>
> connecting said telecommunication terminal apparatus to said switch via an interface;
>
> receiving reception data by said telecommunication terminal apparatus from said switch;
>
> transmitting the reception data by said telecommunication terminal apparatus operating in a first operating mode to said first bus system, and forwarding the reception data via said first bus system to said computer device;
>
> processing, by a processor of said computer device, the reception data received by said computer device from said telecommunication terminal apparatus;
>
> forwarding, by said computer device, to said telecommunication terminal apparatus, processed reception data via said first bus system;
>
> outputting the processed reception data by said telecommunication terminal apparatus;
>
> producing transmission data by said telecommunication terminal apparatus;
>
> forwarding the transmission data by said telecommunication terminal apparatus operating in the first operating mode to said computer device via said first bus system;
>
> processing, by said processor of said computer device, the transmission data received by said computer device to change the transmission data into processed transmission data; and
>
> transmitting, by said computer device, to said telecommunication terminal apparatus, the processed transmission data via said first bus system; and transmitting, by said telecommunication terminal apparatus to said interface for forwarding to said switch.

15. The method according to claim 14, further comprising:

> sending the reception data received by said switch and the transmission data produced by said telecommunication terminal apparatus to said computer device via said telecommunication terminal apparatus, wherein the reception and transmission data received by said computer device represents spoken words;
>
> intermediately storing the reception and transmission data received by said computer device in a transmission data store of said computer device, wherein said computer device further comprises a program that enables simulation of a telephone answering device, and wherein said transmission data store enables repeated time-displaced forwarding of the reception and transmission data representing spoken words to said switch via said telecommunication terminal apparatus; and
>
> forwarding the reception and transmission data received by said computer device, by said computer device, in a time-displaced fashion via said telecommunication terminal apparatus.

16. The method according to claim 14, further comprising:

> obtaining the reception data by said computer device from said switch via said telecommunication terminal apparatus, wherein said computer device further comprises a video conferencing mechanism;
>
> dividing, by said computer device, the reception data into received image data and received speech data;
>
> displaying, by said computer device, the received image data on a display screen of said computer device;
>
> sending, by said computer device, the received speech data back to said telecommunication terminal apparatus;
>
> transmitting the input speech data originating from a microphone of said telecommunication terminal apparatus to said computer device via said first bus system;
>
> assembling, by said computer device, transmission data from the input speech data and the input image data; and
>
> transmitting said transmission data to said switch via said telecommunication terminal apparatus.

* * * * *